(12) United States Patent
Goodrum et al.

(10) Patent No.: US 10,749,858 B2
(45) Date of Patent: Aug. 18, 2020

(54) SECURE LOGIN INFORMATION

(71) Applicant: HEWLETT PACKARD ENTERPRISE DEVELOPMENT LP, Houston, TX (US)

(72) Inventors: Alan Goodrum, Houston, TX (US); Suhas Shivanna, Bangalore (IN); David Koenen, Houston, TX (US); Patrick Schoeller, Houston, TX (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 301 days.

(21) Appl. No.: 15/744,515

(22) PCT Filed: Sep. 4, 2015

(86) PCT No.: PCT/US2015/048713
§ 371 (c)(1),
(2) Date: Jan. 12, 2018

(87) PCT Pub. No.: WO2017/039702
PCT Pub. Date: Mar. 9, 2017

(65) Prior Publication Data
US 2018/0212951 A1     Jul. 26, 2018

(51) Int. Cl.
*H04L 29/06* (2006.01)
*H04L 29/08* (2006.01)

(52) U.S. Cl.
CPC ...... *H04L 63/0823* (2013.01); *H04L 63/0428* (2013.01); *H04L 63/083* (2013.01); *H04L 67/141* (2013.01)

(58) Field of Classification Search
CPC . H04L 63/0823; H04L 67/141; H04L 63/083; H04L 63/0428
See application file for complete search history.

(56) References Cited

U.S. PATENT DOCUMENTS 8,428,929 B2    4/2013   Sakthikumar
9,973,534 B2 *  5/2018   Mahaffey ............... H04L 63/20
(Continued)

FOREIGN PATENT DOCUMENTS

CN   101739315   6/2010
CN   102902526   1/2013
(Continued)

OTHER PUBLICATIONS

Preliminary Report on Patentability received in PCT Application No. PCT/US2015/048713, dated Mar. 15, 2018, 9 pages.
(Continued)

*Primary Examiner* — Christopher A Revak
(74) *Attorney, Agent, or Firm* — Hewlett Packard Enterprise Patent Department

(57) ABSTRACT

An example device includes a processor coupled to a network and a memory coupled to the processor. The memory includes computer code for causing the processor to establish a secure connection between a manageability application and an interconnect device, the interconnect device being in communication with a newly connected networked device; and securely communicate, from the manageability application to the interconnect device, temporary login information for the networked device.

20 Claims, 6 Drawing Sheets

(56) References Cited

U.S. PATENT DOCUMENTS

| | | | |
|---|---|---|---|
| 10,402,797 B2* | 9/2019 | Efroni | H04L 9/3228 |
| 2006/0225130 A1 | 10/2006 | Chen et al. | |
| 2013/0191897 A1* | 7/2013 | Lindteigen | G06F 21/45 |
| | | | 726/6 |
| 2013/0346645 A1 | 12/2013 | Mayhew | |
| 2014/0215589 A1* | 7/2014 | Dietrich | G06F 21/34 |
| | | | 726/6 |
| 2014/0233545 A1 | 8/2014 | Ferguson-James et al. | |
| 2016/0127375 A1* | 5/2016 | Eluard | H04W 12/003 |
| | | | 726/3 |
| 2017/0148019 A1* | 5/2017 | Carrott | G06Q 20/3829 |
| 2018/0054845 A1* | 2/2018 | Lee | H04W 48/14 |
| 2019/0044943 A1* | 2/2019 | Kim | H04W 12/002 |

FOREIGN PATENT DOCUMENTS

| | | |
|---|---|---|
| KR | 1020120069649 | 6/2012 |
| TW | 201430561 | 8/2014 |
| WO | WO-20120158803 | 11/2012 |

OTHER PUBLICATIONS

"Credentials for ILO HP Server," Jul. 15, 2013, 4 pps., <http://community.spiceworks.com/topic/358796-credentials-for-ilo-hp-server>.

International Search Report & Written Opinion received in PCT Application No. PCT/US2015/048713, dated Jun. 2, 2016, 12 pages.

* cited by examiner

SECURE LOGIN INFORMATION

BACKGROUND

Converged infrastructure is meant to provide computer networks that are managed as one unit rather than as separate components. Such components may include various networked devices, such as servers, and interconnect devices to facilitate communication among the networked devices, as well as between networked devices and various users or administrators. The interconnect devices in such an infrastructure may include network switches, for example. Converged infrastructure presents the promise of simple out-of-box setup of computing components, including servers, storage, networking and management appliances.

BRIEF DESCRIPTION OF THE DRAWINGS

For a more complete understanding of various examples, reference is now made to the following description taken in connection with the accompanying drawings in which.

DETAILED DESCRIPTION

Figure 1:
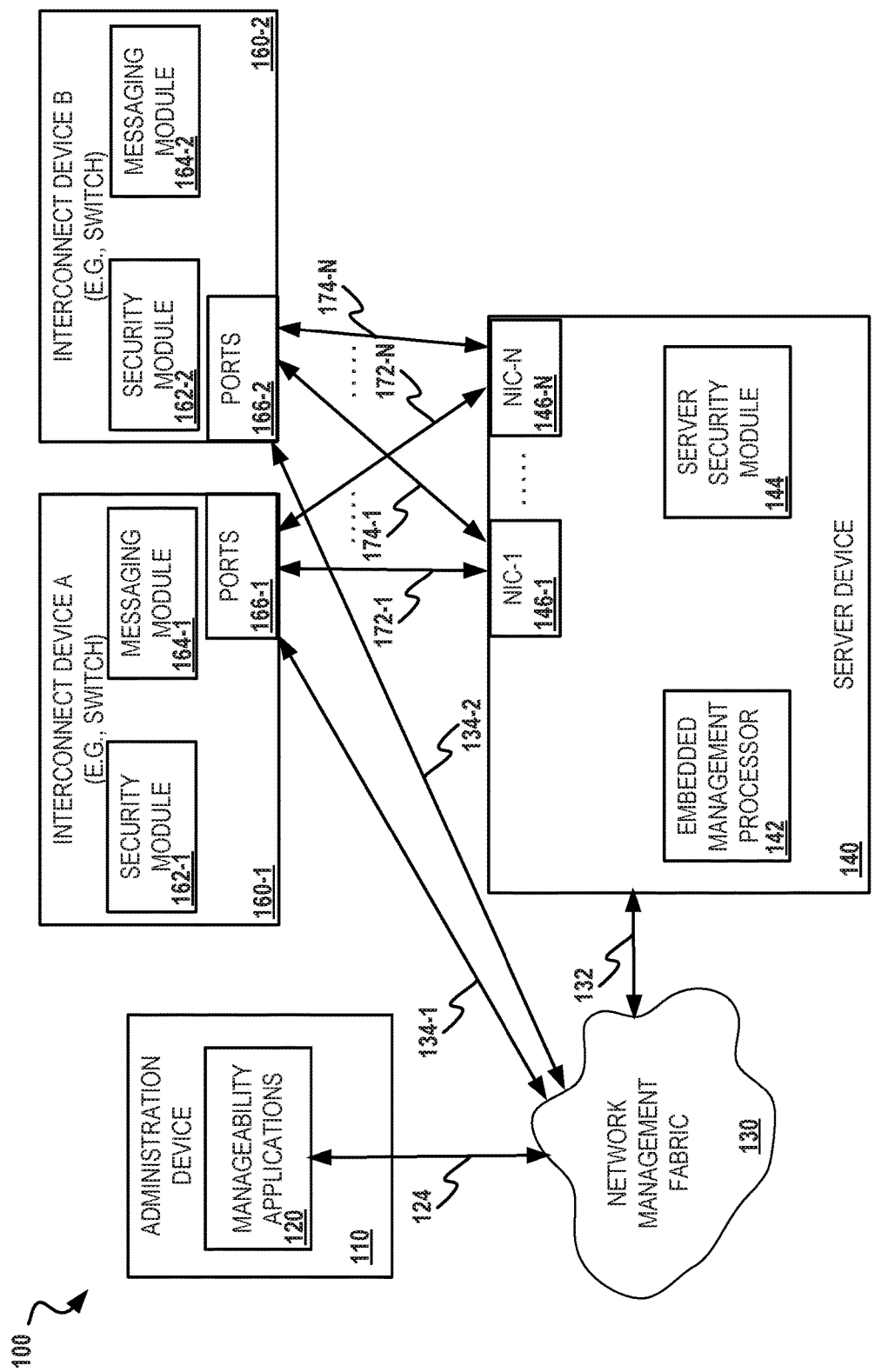
FIG. 1 illustrates an example system for securely providing login credentials to a server device in a network.

As noted above, one of the promises of converged infrastructure is simple out-of-box setup of computing components, including servers, storage, networking and management appliances. Replicating the simple out-of-box experience of blade systems for rack servers, rack switches, and rack management appliances is complicated by several factors, including the fact that physically separated hardware and standard network connections are vulnerable to unauthorized access. If the out-of-box experience for rack systems is to be made simple and reliable, a converged infrastructure management software tool is needed to securely set up a rack server to be managed by management software in an automated way using an out-of-band management processor embedded in the rack server. However, many set up procedures using out-of-band devices may be vulnerable to being misused by hackers to gain unauthorized access to the out-of-band management processor and subsequently to the rack server. In addition, hackers may attempt to hack into interconnect devices such as bridges or switches in order to disrupt normal rack server operation using what is known as a denial-of-service attack and/or a man-in-the-middle attack.

Before management software can manage a server being added to a converged infrastructure system, the management software may need to initialize the Baseboard Management Controller (BMC) embedded in the server. The initialization may include initializing the IP address of the BMC and setting up a username and password so the management software can log in to the BMC. Administrators may use various manual and scripted methods to initialize the BMC on one or more servers. For a small number of servers, the servers are booted one at a time into a setup utility of the server and the values of the IP address, username and password are typed in manually. When a large number of servers are to be set up, a more complicated process may be used. For example, pre-boot executing environment (PXE) utilities of the servers boot the servers to a specialized "pre-boot environment" that can initialize the BMC. In other examples, default BMC username and password may be obtained from a toe tag tied to the server at manufacture and manually entered into the management software. In some cases, DHCP or IPv6 techniques may be used to assign a unique IP address. However, these alternatives are not always available in many datacenters, and the IP address may be set manually along with username and password. Without systems and methods described herein, administrators may continue using manual or scripted methods for initializing BMCs of servers so that the management software can manage the servers.

Disclosed are systems and methods for providing an automated and end-to-end encrypted and authenticated channel from any manageability application to a network interconnect device (e.g., a switch) to initiate a first login with a server that has been newly connected to the interconnect device. The manageability application communicates first login information to the interconnect device over a first secure channel. The manageability application then waits a delay period after communicating the first login information so as to allow the interconnect device to communicate the first login information to a management processor of the newly connected server. After the delay period, the manageability application establishes a second secure connection with the management processor and changes the first login information to second login information that may be used subsequently. This new security architecture provides for simple and secure Out of Band (OOB) deployment when the new server is in a factory default state.

Referring now to the figures, FIG. 1 illustrates an example system 100 for securely providing login credentials to a server device in a network. The system 100 includes an administration device 110. The administration device 110 includes a set of manageability applications 120. The manageability applications 120 may include software, firmware and/or hardware that provide management tools for converged infrastructure that are used by administrators of the system 100 to provision, control, and manage software-defined data center components such as a server device 140 and interconnect devices 160 as well as other components of the system 100. The manageability applications 120 can be used to automate maintenance and management tasks associated with the system 100 as described below.

The administration device 110 is communicatively coupled via a network management fabric 130 to the server device 140 (e.g., a rack-mount server) and at least one network interconnect device 160. Various examples may include any number of network interconnect devices. In the illustrated example, the example system 100 is shown with two network interconnect devices, including a first network interconnect device 160-1 and a second network interconnect device 160-2. The network management fabric 130 comprises a set of physical (or possibly wireless) connections, such as switches and cables, connecting the various components of the system 100 including the administration device 110, the server device 140 and the interconnect devices 160.

The administration device 110 and the server device 140 are communicatively connected via an administration device connection 124 (e.g., a cable), the network management fabric 130, and a server device connection (e.g., a cable) 132. The administration device 110 and the first interconnect device 160-1 are communicatively connected via the administration device connection 124, the network management fabric 130, and a first interconnect device connection (e.g., a cable) 134-1. The administration device 110 and the second interconnect device 160-2 are communicatively connected via the administration device connection 124, the network management fabric 130, and a second interconnect device connection (e.g., a cable) 134-2. The first and second interconnect connections 134-1 and 134-2 may be connected to one of many ports 166-1 and 166-2, respectively, of the first and second interconnect devices 160-1 and 160-2. In one example, the first and second interconnect connections 134-1 and 134-2 are connected to dedicated management ports (e.g., RJ-45 connector ports) in the first and second sets of ports 166-1 and 166-2.

The server device 140 includes an embedded management processor 142, a server security module 144 and multiple network interface cards, or controllers, (NICs) 146-1 to 146-N. The embedded management processor 142 performs functions to manage the server device 140, such functions including those of the BMC. The embedded management processor 142 can be connected to the network management fabric using a dedicated management port on the server and a separate interconnect switch, for example. The server security module 144 performs encryption, authentication and certificate verification operations to authenticate the administration device 110 and to provide secure connections between the server device 140 and the administration device 110.

The first and second interconnect devices 160-1 and 160-2 include first and second security modules 162-1 and 162-2, and first and second messaging modules 164-1 and 164-2, respectively. The interconnect device security modules 162 perform encryption, authentication and certificate verification operations to authenticate the administration device 110 and to provide secure connections between the interconnect devices 160 and the administration device 110. In some examples of the system 100, the server device 140 and the interconnect devices 160 are collocated in a secure environment, e.g., in a rack of a secure datacenter, and encryption and authentication may not be needed between the interconnect devices 160 and the server device 140. In other examples of the system 100, the connection between the server device 140 and the interconnect devices 160 may not have enough physical security to be trusted. In these examples, encryption and authentication between the interconnect devices 160 and the server device 140 may be provided by the interconnect device security modules 162 and the server security module 144.

The interconnect device messaging modules 164, provide for bidirectional communication between the interconnect devices 160, the administration device 110 and the server device 140. The messaging modules 164 may communicate with the server device 140 using Link Layer Discovery Protocol (LLDP) messaging and with the administration device using Hyper Text Transfer Protocol (HTTP). The messages between the messaging modules 164 and the administration device 110 are routed over the first and second interconnect device connections 134-1 and 134-2 via the dedicated port included in the ports 166, the network management fabric, and the administration device connection 124. The messages between the interconnect devices 160 and the server device 140 are routed to one of the 1-N NICs 146-1 to 146-N via 1-N first server device connections (e.g., cables) 172-1 to 172-N, and 1-N second server device connections (e.g., cables) 174-1 to 174-N. The first and second server connections 172 and 174 may be connected to enhanced small form factor pluggable transceivers (SFP+) included in the ports 166 of the interconnect devices 160 and the NICs 146 of the server device 140.

The messaging between the server device 140 and the interconnect devices 160 may include exchange of information including, but not limited to, server device 140 information such as, for example, server serial number ID, NIC port number, IP address of the embedded management processor 142, public key of the embedded management processor, and MAC address of the embedded management processor 142. The messaging between the administration device 110 and the interconnect devices 160 and the server device 140, as will be described in detail below, may include login information (e.g., user name, password, trusted certificate) to securely log in with the interconnect devices 160, server information identifying the server device 140 that the administration device 110 is to manage, and server device 140 login credentials to enable the administration device 110 to logon to the embedded management processor 142 of the server device 140. Other messaging may also be performed. Messages between the server device 140 and the interconnect devices 160 may be exchanged while the server device 140 is full powered up or while the server device 140 is using auxiliary power that powers up a portion of the hardware, before the server device 140 is fully powered up.

The system 100 illustrated in FIG. 1 is an example and other systems may include more server devices 140 and fewer or more interconnect devices 160.

Figure 2:
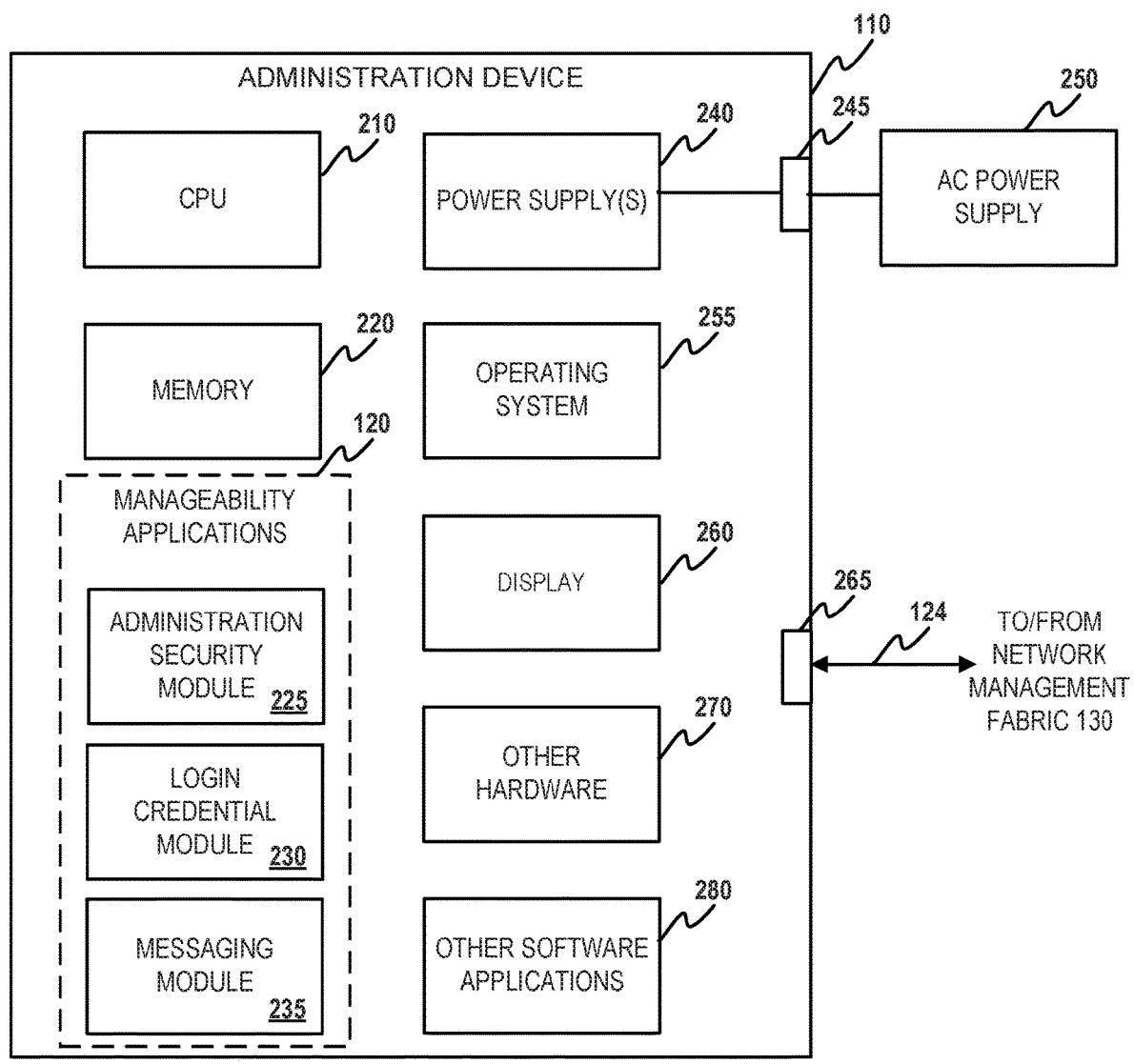
FIG. 2 illustrates an example administration device for use in the system of FIG. 1.

Referring to FIG. 2, an example administration device 110 that may utilize the manageability applications 120 to manage devices in the system of FIG. 1 is illustrated. In this example, the manageability applications include an administration security module 225, a login credential module 230 and a messaging module 235. The manageability applications 120 may be implemented in software, firmware and/or hardware. The example administration device 110 may include embedded firmware and hardware components in order to perform network management functions, some of which are described in detail below, in the system 100. The example administration device 110 may be any type of computing device such as a portable computer or communication device, a standalone server computer, a blade server, etc. The example administration device 110 may include a CPU (central processing unit) 210, at least one memory device 220, and a power supply 240. The power supply 240 is coupled to an electrical interface 245 that is coupled to an external power supply such as an AC power supply 250.

The administration device 110 may include an operating system component 255 including, for example, an operating system driver component and a pre-boot BIOS (Basic Input/Output System) component stored in ROM (read only memory), and coupled to the CPU 210. In various examples, the CPU 210 may have a non-transitory memory device 220. In various examples, the memory device 220 may have one or more of ROM, programmable flash memory or erasable programmable ROM (EPROM). In various examples, the memory device 220 may be integrally formed with the CPU 210 or may be an external memory device. The memory device 220 may include program code that may be executed by the CPU 210. For example, one or more processes may be performed to execute the manageability applications 120, a user control interface and/or other software applications 280.

The administration device 110 may include a display 260 to provide visual information to a network administrator. The administration device 110 also includes a network interface 265 and other hardware 270 known to those skilled in the art. The network interface 265 is coupled to the network management fabric 130 via the administration device connection 124.

The administration security module 225 performs encryption, authentication and certificate verification operations to authenticate the administration device 110 with the interconnect devices 160 and the server device 140, and to provide secure connections between the interconnect devices 160 and the server device 140. The authentication procedures may be based on a certificate signed by a trusted certificate authority (CA). The secure connections may comprise a secure sockets connection (SSL). The administration security module 225 may also use a shared secret that is also stored on the embedded management processor 142 in order to dynamically generate encryption keys using a combination of nonce, server serial number, MAC address of one of the NICs 146 and/or a shared master key.

The login credential module 230 stores login credential information associated with the server device 140 and other devices that the administration device 110 may manage. The login credential information may include server serial number ID, NIC port number, IP address of the embedded management processor 142, and MAC address of the embedded login credential module 230 may have one or more of ROM, programmable flash memory or erasable programmable ROM (EPROM).

The administration device messaging module 235 provides for bidirectional communication between the administration device 110, the interconnect devices 160 and the server device 140. The messaging module 235 may communicate with the server device 140 and the interconnect devices 160 using various types of messaging, such as secure messaging using SSL. As described above, the messaging between the administration device 110 and the interconnect devices 160 and the server device 140, as will be described in detail below, may include login information (e.g., user name, password, trusted certificate) for the administration device 110 to login with the interconnect devices 160, server information identifying the server device 140 to be managed by the administration device 110, and server device 140 login credentials to enable the administration device 110 to logon to the embedded management processor 142 of the server device 140. Other messaging may also be performed.

Figure 3:
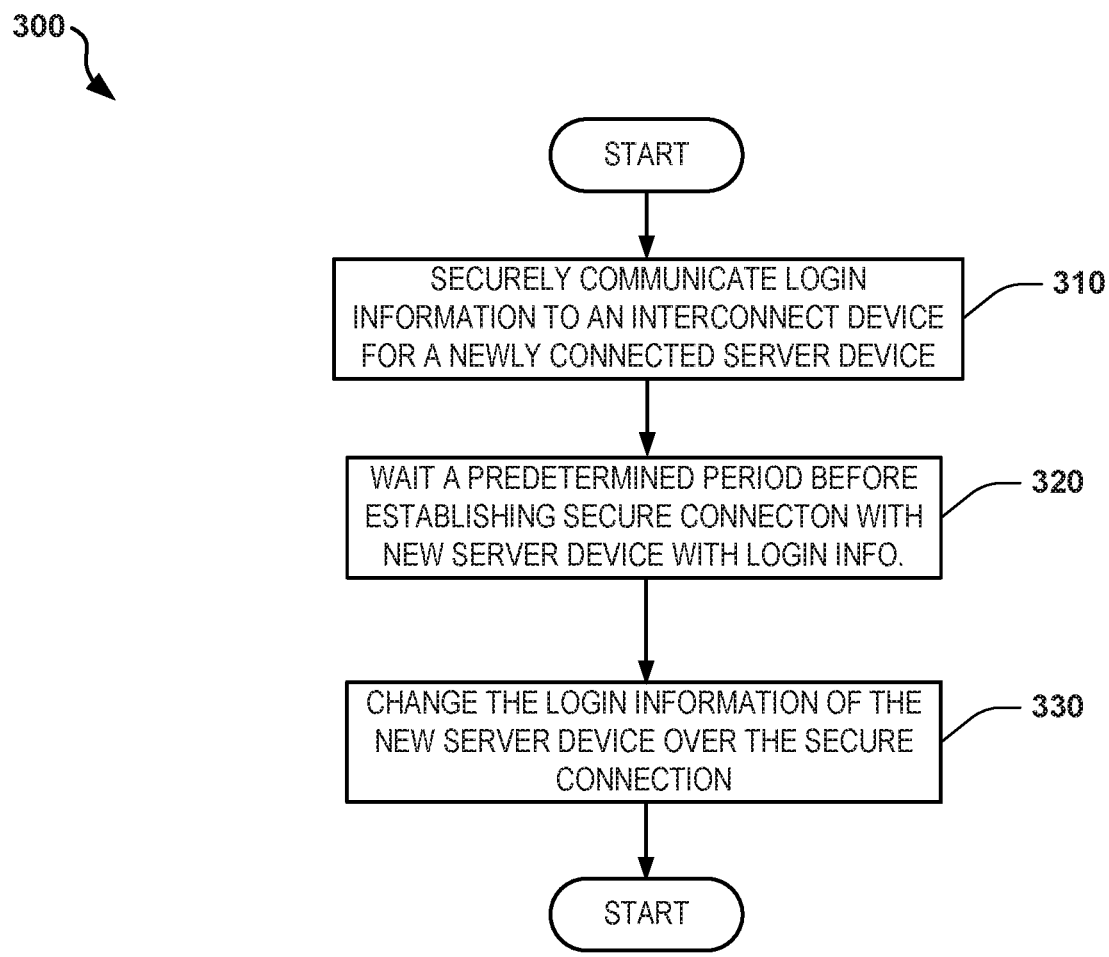
FIG. 3 illustrates an example flow diagram for an example process for providing login credentials to a server device in the system of FIG. 1.

Referring to FIG. 3, an example flow diagram for an example process 300 for providing login credentials to a server device 140 in the system 100 of FIG. 1 is illustrated. The process 300 is an example and may be modified. The example process 300 of FIG. 3 will now be described with further references to FIGS. 1 and 2.

The process 300 may be initiated when a server device, e.g., the server device 140, or other managed network device, is inserted into a computer rack that is being managed, at least in part, by the administration device 110. The process 300 establishes a chain of trust from the manageability applications 120 to one or more of the interconnect devices 160 and to the embedded management processor 142. The manageability applications 120 may discover the newly mounted server device 140 by reading information out of one or both of the interconnect devices 160 that was stored there by an LLDP packet that was automatically sent from the embedded management processor 142. The chain of trust is built by establishing a first secure authenticated channel between the manageability applications 120 and one of the interconnect devices 160 using a combination of shared secret keys and/or certificates for authenticating the requests of the manageability applications. The first secure authenticated channel is established by the administration security module 225 logging in to one of the interconnect devices 160 and the interconnect device 160 verifying the authenticity of the manageability applications 120.

The process 300 may begin with a CPU 210 executing the manageability applications 120 to securely communicate login information stored in the login credential module 230 to one of the interconnect devices 160, the login credentials or information (referred to from herein as login information) being associated with a server device, e.g., the server device 140, that has been newly or recently connected to one of the interconnect devices 160 and then discovered by the manageability applications 120 over the first secure authenticated channel (block 310). The first secure connection may be secured using SSL with an administration device username/password associated with the manageability applications 120 (and known by the interconnect devices 160) being manually entered into the administration device 110. The server login information may be communicated from the interconnect devices 160 to the server device 140 in an LLDP message created by the appropriate interconnect module 160, for example. Additional security controls may be added such as, mandating physical presence (e.g. press a button on the server device 140 after racking the server device 140, the button push indicating to the embedded management processor 142 to accept encrypted packets over LLDP with a further option authenticating the manageability applications using trusted certificates). The server login information, in this example, is the initial login information to be used by the newly connected server device 140. The login information may include a username, password and, in some cases, an IP address to be used by the embedded management processor 142. Some administrators may prefer to assign the IP address using other mechanisms rather than allowing the manageability applications 120 to determine the IP address. Details of functions performed in order to securely communicate the login information at block 310 are described below in reference to FIG. 4.

Subsequent to communicating the login information to the interconnect device 160, the CPU 210 causes the manageability applications 120 to wait an amount of time (referred to herein as a delay time) before establishing a second secure connection (e.g., using HTTPS) with the server device 140 using the communicated login information (block 320). The delay time may be a predetermined fixed delay time that is sufficient enough to allow the login information, in an LLDP message, to be sent by the interconnect device 160 to the embedded management processor 142. As discussed above, the LLDP message does not have to be encrypted between the interconnect device 160 and the server device 140, but the login information within the LLDP message is encrypted so that the embedded management processor can verify authenticity of the manageability applications 120 and security of the login information.

When the delay time has expired, the CPU 210 may cause the administration security module 225 to ping the embedded management processor 142 at the IP address reported by the server device 140 to the interconnect device 160, or at an IP address that the login credential module 230 sent to the interconnect device 160 at block 310. If a timeout period for the embedded management processor 142 to respond to the ping expires, the CPU 210 may display an error message to the administrator via the display 260.

The login procedure may include the CPU 210 causing the administration security module 225 to provide the username/password, and, in some examples, digital signatures of the message and the signing certificate, to the messaging module 235 to be included in the LLDP login message sent to the embedded messaging processor 142. If the login and/or security checks performed by the embedded management processor 142 are unsuccessful, the CPU 210 may cause the manageability applications 120 to repeat the functions of blocks 310 and 320. After a certain number of unsuccessful login attempts (e.g., 3 times), the CPU 210 may report an error to the administrator via the display 260. If the login attempt and security checks at block 320 are successful, the process 300 continues to block 330.

Subsequent to establishing the second secure connection with the embedded management processor 142 and the server device 140, the CPU 210 causes the messaging module 235 to send a secure message to the embedded management processor 142 that causes the embedded management processor 142 to change the login information that was communicated at block 310 to new login information to be used subsequently (block 330). The message can be encrypted using various encryption techniques, such as SSL, for example.

Changing the login information at block 330 may, in some examples, include an authentication or verification of the administration device 110 or the manageability application 120. In some examples, the verification may be done using a certificate signed from a trusted certificate authority. Some trusted default CA keys may be stored in the embedded management processor 142 and Transport Layer Security (TLS) mutual authentication may be used during the second secure connection to verify the client certificate before accepting the changed login information. For certificate based authentication, the embedded management processor 142 may use the subject information or the Subject Alternative name (SAN) in the certificate to identify the instance of the manageability applications 120.

Figure 4:
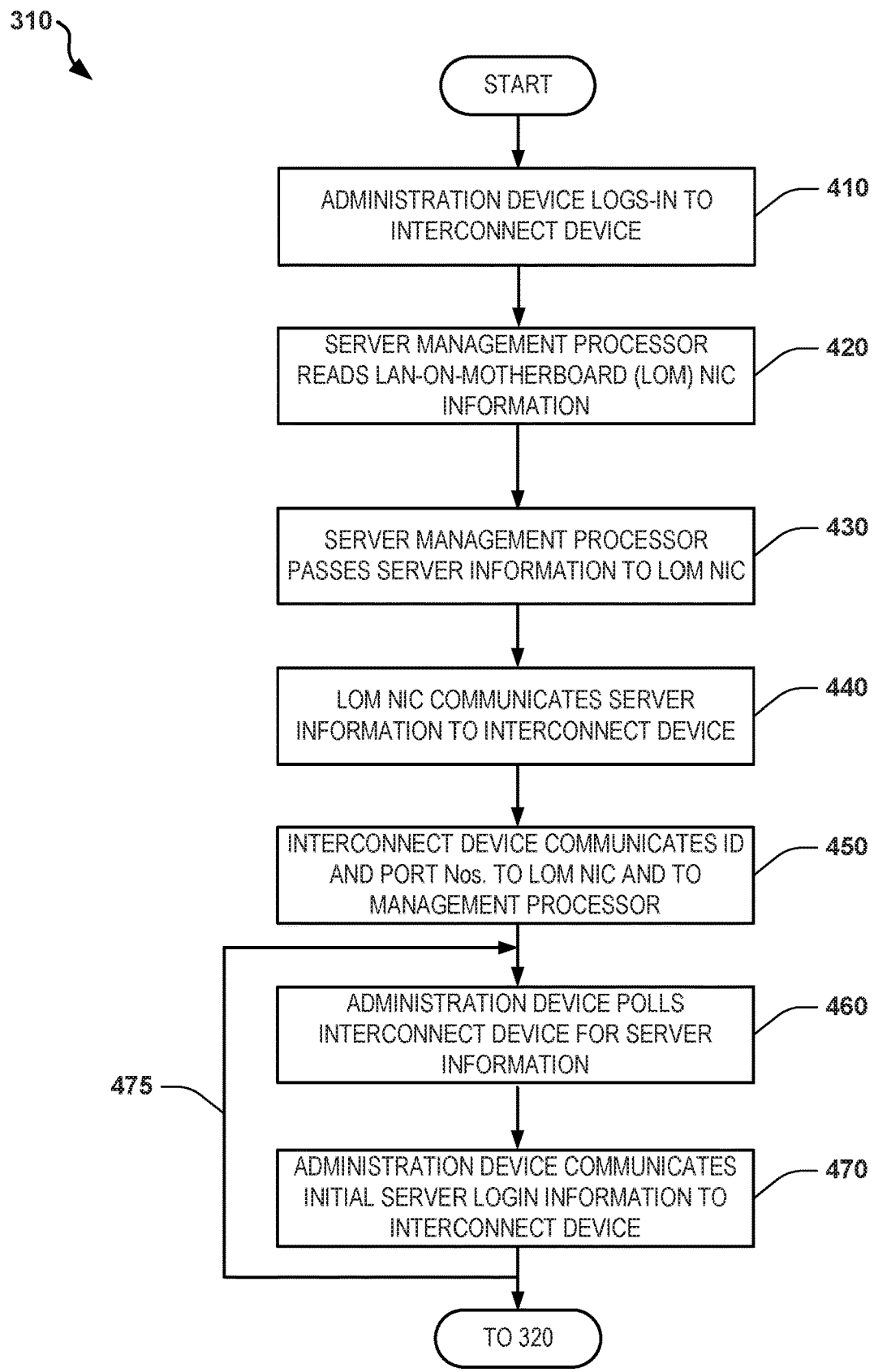
FIG. 4 illustrates further details of a portion of the example process of FIG. 3.

Referring to FIG. 4, further details of example functions that may be performed at block 310 of the example process 300 of FIG. 3 are illustrated. At block 410, the administration device 110 logs-into one or both of the first and second interconnect devices 160-1 and 160-2. The login procedure at block 410 may include the CPU 210 causing the messaging module 235 to send an encrypted message to one or both of the interconnect devices 160 via the administration device connection 124, the network management fabric 130 and the first interconnect device connection 134-1. The encrypted message may include a username and password that the first interconnect device 160-1 uses to authenticate the manageability applications 120 of the administration device 110. The interconnect devices 160 enable future transmission of login credentials by the administration device 110 upon successful completion of the login at block 410.

At block 420, the embedded server management processor 142 reads NIC information from one of the NICs 146 that is designated as the LAN-on-motherboard (LOM) NIC. The LOM NIC is configured to allow the administration device 110 to remotely power-up the server device 140 and to configure the server device 140. The NIC information may include a NIC ID, the number of logical NICs 146, etc.

The embedded server management processor 142 reads NIC information for each of the NICs 146-1 to 146-N at block 420.

At block 430, the embedded management processor 142 passes server information to the designated LOM NIC 146. The server information may be passed over an Inter-Integrated Circuit or I²C link. The server information may include a server ID for the server device 140, a present IP address for the embedded management processor 142, a present MAC address for the embedded management processor 142 and possibly other information. The embedded management processor 142 may send this information to each of the NICs 146-1 to 146-N which include the designated LOM NIC as well as Peripheral Component Interconnect Express (PCIe) NICs which may be configured to operate according to the high-speed serial computer expansion bus standard.

At block 440, the designated LOM NIC 146 and each of the PCIe NICs 146 communicate the server information passed from the embedded management processor 142 at block 430 to the first connection ports 166-1 of the first interconnect device 160-1 and to the second connection ports 166-2 of the second interconnect device 160-2 via the first connections 172-1 to 172-N and second connections 174-1 to 174-N connecting the NICs 146 to the first and second interconnect devices 160-1 and 160-2, respectively.

At block 450, the first and second interconnect devices 160-1 and 160-2 pass ID information identifying each interconnect device 160 and identifying port numbers of the first and second connection ports 166-1 and 166-2 to each of the NICs 146-1 to 146-N of the server device 140. The NICs 146-1 to 146-N then proceed to forward this information to the embedded management processor 142 for use in future communications with the interconnect devices 160.

At block 460 the CPU 210 causes the messaging module 235 to use the secure administration connection established when logging-in to the interconnect devices 160 at block 410 to periodically poll the interconnect devices for new server information associated with new server devices such as the server device 140 that have been recently connected to the first and second interconnect devices 160-1 and 160-2. The polling at block 460 may comprise reading LLDP data structures stored in the interconnect devices 160 and communicated to the messaging module 235 of the administration device 110 by the messaging modules 164-1 and 164-2 of the first and second interconnect devices 160-1 and 160-2 respectively. The server information may include port numbers of the interconnect device ports 166-1 and 166-2, an ID of the server device 140, IDs of the NICs 146-1 to 146-N and IP and MAC addresses being used presently by the embedded management processor 142.

At block 470, as described above in reference to the block 310 of the process 300 in FIG. 3, the CPU 210 causes the manageability applications 120 to securely communicate an LLDP message including the initial login information stored in the login credential module 230 to one or both of the first and second interconnect devices 160-1 and 160-2, the login information being associated with the server device 140, that has been newly or recently connected to the first and second interconnect devices 160-1 and 160-2 and discovered by the manageability applications 120 at block 460. The initial login information communicated at block 470 may include one or more of a port number identifying one of the first and second interconnect device connection ports that the designated LOM NIC 146 of the server device 140 is connected to, in some examples, a new IP address to be used subsequently by the embedded management processor 142, an initial username and password to be used by the administration device for subsequent logins to the embedded management processor 142, and security information such as encryption key, authentication information and a signed certificate.

The blocks 460 and 470 may be repeated periodically, as indicated by arrow 475, to identify new server devices that are newly connected to the interconnect devices 160. After completing the functions at block 470, the process 300 continues on to the block 320 as described above.

Figure 5:
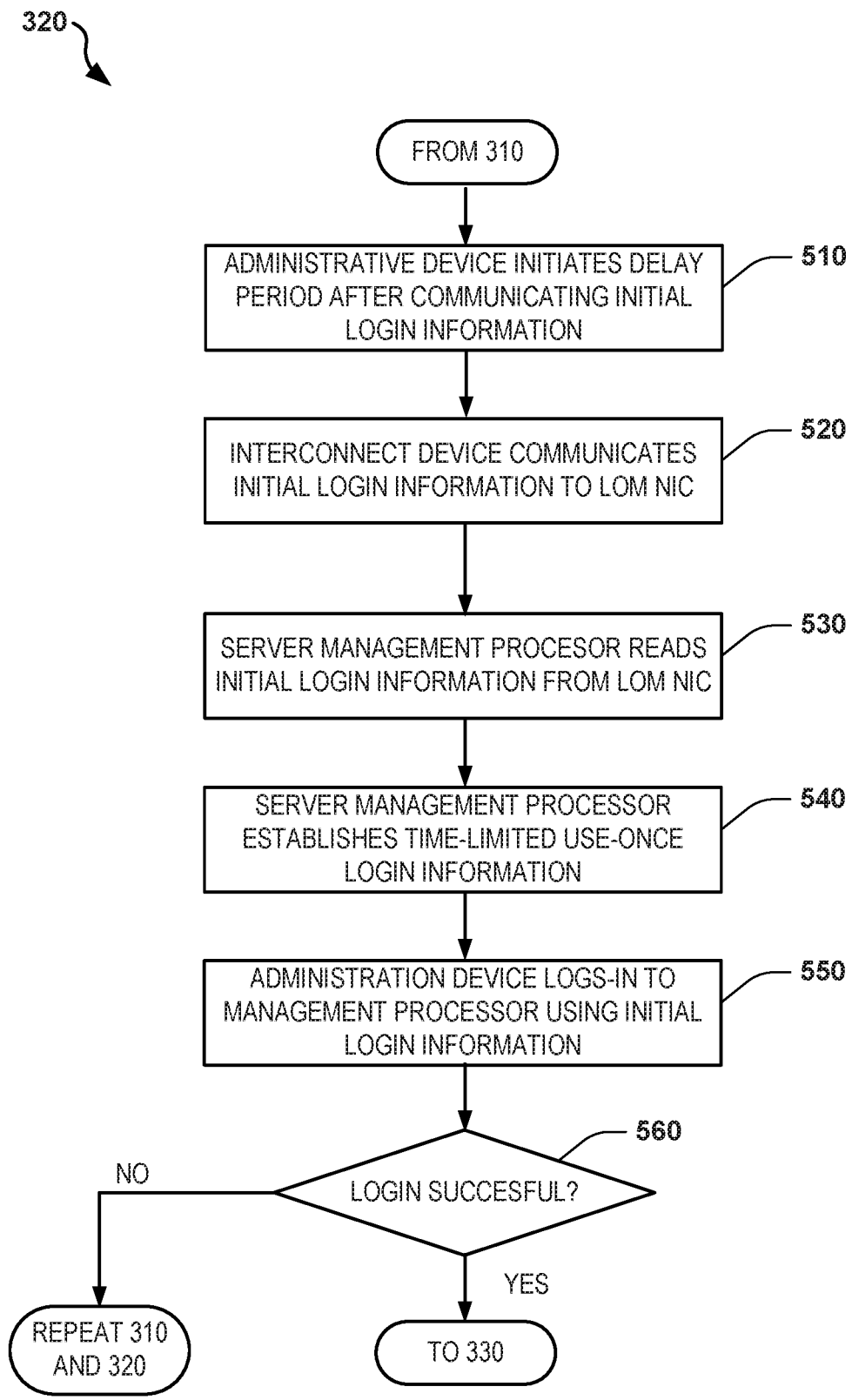
FIG. 5 illustrates further details of another portion of the example process of FIG. 3.

Referring to FIG. 5, further details of example functions that may be performed at block 320 of the example process 300 of FIG. 3 are illustrated. At block 510, the administration device 110 initiates a delay period after the initial login information was securely communicated to the interconnect devices 160 at block 310 in the process 300 of FIG. 3 or at block 470 in the detailed process of block 310 illustrated in FIG. 4. The delay period may be a fixed or variable delay period that is sufficient to allow one or both of the first and second interconnect devices 160-1 and 160-2 to send the initial login information to the embedded management processor 142. In various examples, the first and second interconnect devices 160-1 and 160-2, using the first and second messaging modules 164-1 and 164-2, respectively, may communicate an acknowledgement message to the messaging module 235 of the administration device 110 that may be used to indicate that sufficient delay time has passed and the embedded management processor 142 has received the initial login information, as is described below in reference to block 530.

At block 520, the interconnect devices 160 send the initial login information to the designated LOM NIC 146 of the server device 140, e.g., in an LLDP message. The username, password and, in some examples, IP address are encrypted in the LLDP message by the administration security module 225 and the messaging module 235. The LLDP message may be encrypted additionally by the interconnect devices 160 or not, as described above. As is described above, the initial login information may include one or more of a port number identifying one of the first and second interconnect device connection ports 166-1 or 166-2 that designated LOM NIC 146 of the server device 140 is connected to, in some examples, a new IP address to be used subsequently by the embedded management processor 142, an initial username and password to be used by the administration device for subsequent logins to the embedded management processor 142, and security information such as encryption key, authentication information and a signed certificate. In various examples, the communicating of the initial login information at block 520 may comprise some form of acknowledgement messages or requests for repetition of communicating the acknowledgement message between the designated LOM NIC 146 and the interconnect devices 160.

At block 530, the embedded management processor 142 reads the initial login information from the designated LOM NIC 146, e.g., on the next periodic polling cycle. The embedded management processor 142 decrypts the username, password and, in some examples, an IP address using various encryption techniques. If the decryption of username, password and/or IP address fails, the username, password and/or IP address are discarded and future login attempts, at block 550, will fail as is described below.

At block 540, the embedded management processor 142, in various examples, establishes a time-limited, use-once username and password based on the initial login information. In this regard, a login using the initial login information, as described below with reference to block 550, within the time-limited period is a valid login. If an IP address is included in the login information, the embedded management processor 142 remembers the old IP address it was currently using and changes to the new IP address. In various examples, the embedded management processor 142 may start a timer to hold off accepting another IP address as a defense against denial-of-service (DOS) attacks. The embedded management processor 142 also starts a timer used to limit the amount of time that the use-once username and passwords are valid.

At block 550, the CPU 210 of the administration device 110 causes the manageability applications 120 to log in to the embedded management processor 140 via the administration device connection 124, the network management fabric 130 and the server device connection 132. The login may comprise a ping sent by the messaging module 235 to the IP address reported by the embedded management processor 142 or the new IP address communicated to the embedded management processor in the initial login information. The login is based on the username and password included in the initial login information previously communicated by the administration device 110 at block 520. The login procedure may also include authentication based on a signed certificate included in the initial login information, as described above.

In various examples, the login procedure at block 550 may comprise using shared secret information stored in the administration security module 225 of the administration device 110 and in the embedded management processor 142. The shared secret information may be a dynamically generated key derived using a combination of nonce, server serial number, MAC address and a shared master key, for example.

At decision block 560, if the login at block 550 is successful, the process flow returns to block 330 of the process 300 illustrated in FIG. 3 to change from the initial login information to new login information that may be used indefinitely to login to the embedded management processor 142. If the login at block 550 is unsuccessful, the blocks 310 and 320 of the process 300 are repeated. The failure to login may be due to a timeout of the use-once username and password timer or improper communication of the username and password. Subsequent to a failed login attempt, the embedded management processor 142 may revert back to the old IP address and discard the initial login information. In various examples, subsequent to failed login attempts, the embedded management processor 142 may increase the use-once time period (e.g., from 1 minute, to 5 minutes, to 25 minutes and so on to some maximum time period such as, for example, an hour).

Figure 6:
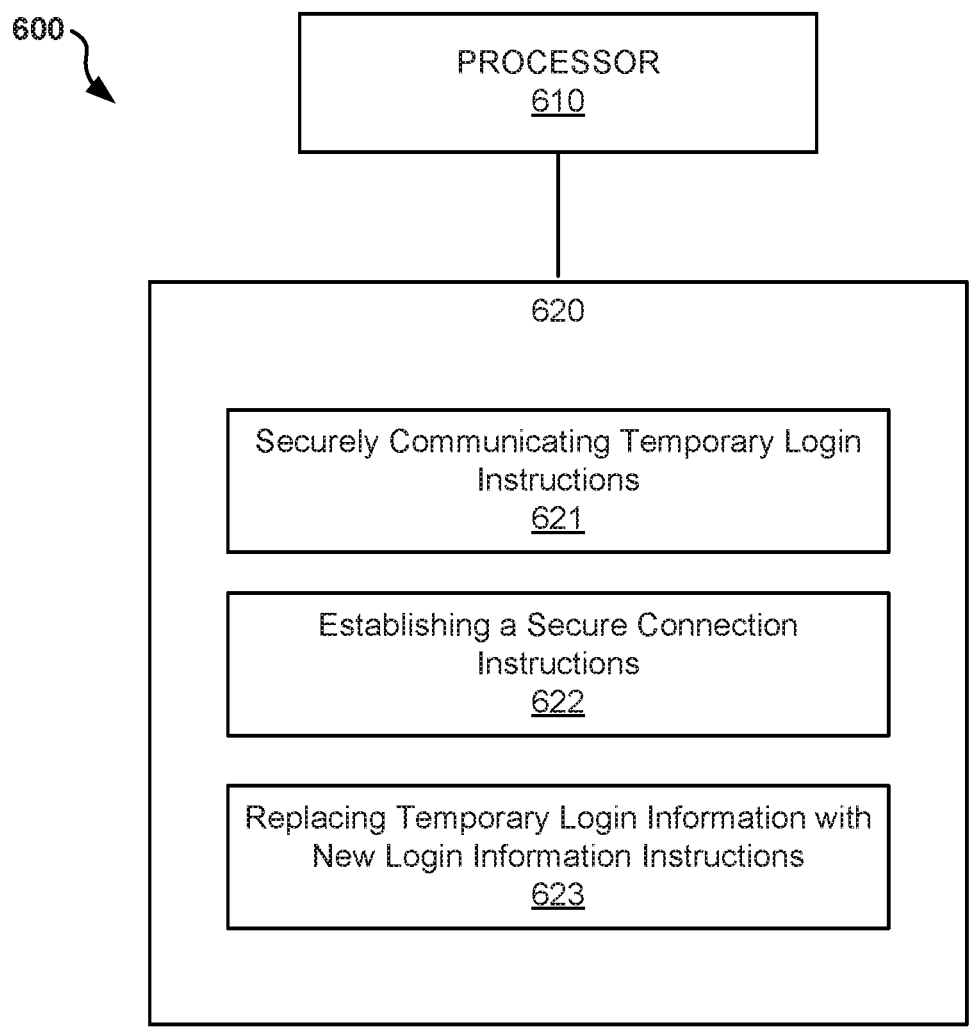
FIG. 6 illustrates a block diagram of an example system with a computer-readable storage medium including instructions executable by a processor to provide secure login credentials.

FIG. 6 illustrates a block diagram of an example system with a computer-readable storage medium including example instructions executable by a processor to provide secure login credentials. The system 600 includes the processor 610 and the computer-readable storage medium 620. The computer-readable storage medium 620 includes example instructions 621-623 executable by the processor 610 to perform various functionalities described herein.

The example instructions includes securely communicating temporary login instructions 621. The instructions 621 cause the processor 610 to securely communicate, from a manageability application to an interconnect device, temporary login information for a networked device. As described above, the networked device may be a newly connected to the interconnect device.

The example instructions 622 cause the processor 610 to establish a secure connection between the manageability application and the networked device using the temporary login information. The example instructions further include replacing temporary login information with new login information instructions 623. The example instructions 623 cause the processor 610 to, via the secure connection, replace the temporary login information with new login information for subsequent use.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A first device comprising:
 a processor; and
 a non-transitory storage medium comprising computer code executable on the processor to:
  establish a secure connection between a manageability application in the first device and an interconnect device;
  discover, based on accessing information from the interconnect device, a networked device that is newly connected, wherein the manageability application in the first device is to communicate with the networked device through the interconnect device;
  securely communicate, from the manageability application to the interconnect device, temporary login information for the networked device;
  responsive to a login at the networked device based on the temporary login information being successful, replace the temporary login information with new login information for subsequent use in logging into the networked device; and
  manage, by the manageability application, the networked device.

2. The first device of claim 1, wherein the computer code is executable on the processor to:
 establish a second secure connection between the manageability application and the networked device using the temporary login information; and
 replace the temporary login information with the new login information over the second secure connection.

3. The first device of claim 1, wherein the computer code is executable on the processor to securely connect to the interconnect device by logging into the interconnect device to authenticate the manageability application in the first device prior to communicating the temporary login information.

4. The first device of claim 3, wherein the computer code is executable on the processor to receive an acknowledgement message from the interconnect device, the acknowledgement message indicating that the networked device has received the temporary login information from the interconnect device.

5. The first device of claim 1, wherein the temporary login information comprises a username and a password.

6. The first device of claim 1, wherein the computer code is executable on the processor to:
 send, to the networked device, a secure message to replace the temporary login information with the new login information.

7. The first device of claim 1, wherein the temporary login information comprises a network address to be used by a management processor of the networked device, and wherein the computer code is executable on the processor to:
 log into the management processor using the temporary login information based on sending a message to the network address.

8. A method comprising:
 discovering, by an administration device based on accessing information at an interconnect device, a newly connected device in a network, the newly connected device being newly connected to the interconnect device;
 securely communicating, by the administration device with the interconnect device over the network, initial login information for the newly connected device;
 waiting a delay period subsequent to the communicating, and after the delay period, establishing, by the administration device, a secure connection with the newly connected device over the network using the initial login information;
 responsive to a login at the newly connected device based on the initial login information being successful, changing the initial login information, via the secure connection, to new login information for subsequent use by the administration device in logging into the newly connected device; and
 managing, by the administration device, the newly connected device.

9. The method of claim 8, wherein the securely communicating comprises encrypting the initial login information using a shared secret key or a trusted certificate to establish a trust between the administration device and the newly connected device using the interconnect device as a proxy.

10. The method of claim 8, further comprising securely connecting to the interconnect device by logging the administration device into the interconnect device to authenticate a manageability application of the administration device prior to communicating the initial login information.

11. The method of claim 8, wherein the delay period is to allow the newly connected device to retrieve the initial login information from the interconnect device prior to the administration device establishing the secure connection with the newly connected device.

12. The method of claim 11, further comprising receiving, by the administration device, an acknowledgement message from the interconnect device, the acknowledgement message indicating that the newly connected device has received the initial login information from the interconnect device.

13. The method of claim 8, wherein the initial login information comprises a username and a password.

14. The method of claim 8, comprising:
sending, by the administration device to the newly connected device, a secure message to change the initial login information to the new login information.

15. The method of claim 8, wherein the initial login information comprises an Internet Protocol (IP) address to be used by a management processor of the newly connected device, and wherein the method comprises:
logging, by the administration device, into the management processor using the initial login information based on sending a message to the IP address.

16. A non-transitory computer-readable medium comprising instructions that upon execution cause a first device to:
discover, based on accessing information at an interconnect device, a networked device that is newly connected to the interconnect device;
securely communicate, to the interconnect device using a manageability application in the first device, initial login information for the networked device;
establish a secure connection between the manageability application and the networked device using the initial login information;
responsive to a login at the networked device based on the initial login information being successful, replace the initial login information with new login information for subsequent use by the first device in logging into the networked device; and
manage, using the manageability application, the networked device.

17. The non-transitory computer-readable medium of claim 16, wherein the instructions upon execution cause the first device to securely connect to the interconnect device by logging the first device into the interconnect device to authenticate the manageability application of the first device prior to communicating the initial login information.

18. The non-transitory computer-readable medium of claim 16, wherein the instructions upon execution cause the first device to wait a delay period prior to establishing the secure connection with the networked device.

19. The non-transitory computer-readable medium of claim 18, wherein the instructions upon execution cause the first device to receive an acknowledgement message from the interconnect device, the acknowledgement message indicating that the networked device has received the initial login information from the interconnect device.

20. The non-transitory computer-readable medium of claim 16, wherein the initial login information comprises a network address to be used by a management processor of the networked device, and wherein the instructions upon execution cause the first device to:
log into the management processor using the initial login information based on sending a message to the network address.

* * * * *